(12) United States Patent
Nickel

(10) Patent No.: US 9,600,135 B2
(45) Date of Patent: Mar. 21, 2017

(54) MULTIMODAL USER NOTIFICATION SYSTEM TO ASSIST IN DATA CAPTURE

(75) Inventor: Sean Nickel, Monroeville, PA (US)

(73) Assignee: Vocollect, Inc., Pittsburgh, PA (US)

( * ) Notice: Subject to any disclaimer, the term of this patent is extended or adjusted under 35 U.S.C. 154(b) by 305 days.

(21) Appl. No.: 12/879,728

(22) Filed: Sep. 10, 2010

(65) Prior Publication Data

US 2012/0066600 A1    Mar. 15, 2012

(51) Int. Cl.
*G06F 3/0481*    (2013.01)
*G06F 9/06*    (2006.01)
(Continued)

(52) U.S. Cl.
CPC ............ *G06F 3/0481* (2013.01); *G10L 15/26* (2013.01); *G06F 9/06* (2013.01); *G06F 9/4446* (2013.01); *G06F 17/20* (2013.01); *G06F 17/243* (2013.01)

(58) Field of Classification Search
CPC ... G06F 3/00; G06F 3/048; G06F 3/16; G06F 3/0483; G06F 3/0481; G06F 2340/12; G06F 3/04842; G06F 3/0237; G06F 2340/0407; G06F 3/0482; G06F 3/0485; G06F 3/04817; G06F 3/04847; G06F 17/243; G06F 9/4446
(Continued)

(56) References Cited

U.S. PATENT DOCUMENTS 5,010,495 A    4/1991  Willetts
5,012,511 A    4/1991  Hanle
(Continued)

FOREIGN PATENT DOCUMENTS

EP    1496405    1/2005
JP    2002230466 A * 8/2002
(Continued)

OTHER PUBLICATIONS

Ten-pages—Bouillon, L. et al., "Retargeting web pages to other computing platform with Vaquita", Reverse Engineering, 2002, Proceedings, Ninth Working Conference on 29 Oct. 1, 2002— Nov. 1, 2002, Piscataway, NJ, USA, IEEE, Oct. 29, 2002 (Oct. 2002), pp. 338-348, XP10624986, ISBN: 0-7695-1799-4, Section 4, Table 2.
(Continued)

*Primary Examiner* — Doon Chow
*Assistant Examiner* — Le Nguyen
(74) *Attorney, Agent, or Firm* — Additon, Higgins & Pendleton, P.A.

(57) ABSTRACT

A system for executing a multimodal software application includes a mobile computer device with a plurality of input interface components, the multimodal software application, and a dialog engine in operative communication with the multimodal software application. The multimodal software application is configured to receive first data from the plurality of input interface components. The dialog engine executes a workflow description from the multimodal software application by providing prompts to an output interface component. Each of these prompts includes notification indicating which of the input interface components are valid receivers for that respective prompt. Furthermore, the notification may indicate the current prompt and at least the next prompt in sequence.

12 Claims, 10 Drawing Sheets

(51) Int. Cl.
*G06F 17/20* (2006.01)
*G10L 15/26* (2006.01)
*G06F 9/44* (2006.01)
*G06F 17/24* (2006.01)

(58) Field of Classification Search
USPC .................. 715/859, 824, 780, 772, 709
See application file for complete search history.

(56) References Cited

U.S. PATENT DOCUMENTS

| | | | | |
|---|---|---|---|---|
| 5,267,327 | A | * | 11/1993 | Hirayama ................ 382/161 |
| 5,276,794 | A | * | 1/1994 | Lamb, Jr. ................ 715/202 |
| 5,386,494 | A | | 1/1995 | White |
| 5,481,645 | A | | 1/1996 | Bertino et al. |
| 5,632,002 | A | * | 5/1997 | Hashimoto ............ G06F 3/165 704/231 |
| 5,682,439 | A | * | 10/1997 | Beernink et al. ............ 382/187 |
| 5,748,841 | A | | 5/1998 | Morin |
| 5,778,404 | A | * | 7/1998 | Capps et al. ................ 715/234 |
| 5,812,977 | A | | 9/1998 | Douglas |
| 5,884,265 | A | | 3/1999 | Squitteri |
| 5,890,123 | A | | 3/1999 | Brown et al. |
| 5,892,813 | A | | 4/1999 | Morin et al. |
| 5,903,870 | A | | 5/1999 | Kaufman |
| 5,909,667 | A | | 6/1999 | Leontiades et al. |
| 5,950,167 | A | | 9/1999 | Yaker |
| 5,956,675 | A | | 9/1999 | Setlur et al. |
| 5,974,384 | A | | 10/1999 | Yasuda |
| 5,991,726 | A | | 11/1999 | Immarco et al. |
| 6,012,030 | A | | 1/2000 | French-St. George et al. |
| 6,044,347 | A | | 3/2000 | Abella et al. |
| 6,061,666 | A | * | 5/2000 | Do et al. ................ 705/43 |
| 6,173,266 | B1 | | 1/2001 | Marx et al. |
| 6,185,535 | B1 | | 2/2001 | Hedin et al. |
| 6,233,559 | B1 | | 5/2001 | Balakrishnan |
| 6,233,560 | B1 | | 5/2001 | Tannenbaum |
| 6,243,682 | B1 | | 6/2001 | Eghtesadi et al. |
| 6,246,989 | B1 | | 6/2001 | Polcyn |
| 6,266,641 | B1 | | 7/2001 | Takaya |
| 6,321,198 | B1 | | 11/2001 | Hank et al. |
| 6,330,539 | B1 | | 12/2001 | Takayama et al. |
| 6,424,357 | B1 | | 7/2002 | Frulla |
| 6,434,526 | B1 | | 8/2002 | Cilurzo |
| 6,438,523 | B1 | | 8/2002 | Oberteuffer et al. |
| 6,496,799 | B1 | | 12/2002 | Pickering |
| 6,504,914 | B1 | | 1/2003 | Brademann et al. |
| 6,636,587 | B1 | | 10/2003 | Nagai et al. |
| 6,707,942 | B1 | * | 3/2004 | Cortopassi et al. .......... 382/186 |
| 6,915,258 | B2 | | 7/2005 | Kontonassios |
| 6,996,800 | B2 | | 2/2006 | Lucassen |
| 7,003,079 | B1 | | 2/2006 | McCarthy et al. |
| 7,003,464 | B2 | | 2/2006 | Ferrans et al. |
| 7,028,265 | B2 | | 4/2006 | Kuromusha et al. |
| 7,039,166 | B1 | | 5/2006 | Peterson et al. |
| 7,146,323 | B2 | | 12/2006 | Guenther et al. |
| 7,167,830 | B2 | | 1/2007 | Sravanapudi et al. |
| 7,212,971 | B2 | | 5/2007 | Jost et al |
| 7,216,351 | B1 | | 5/2007 | Maes |
| 7,257,537 | B2 | | 8/2007 | Ross et al. |
| 7,480,867 | B1 | * | 1/2009 | Racine et al. ................ 715/744 |
| 7,487,440 | B2 | | 2/2009 | Gergic et al. |
| 2002/0178344 | A1 | | 11/2002 | Bourguet et al. |
| 2003/0009742 | A1 | * | 1/2003 | Bass et al. ................ 717/104 |
| 2004/0083479 | A1 | | 4/2004 | Bondarenko |
| 2004/0181461 | A1 | * | 9/2004 | Raiyani et al. ................ 705/26 |
| 2004/0181467 | A1 | * | 9/2004 | Raiyani et al. ................ 705/28 |
| 2004/0196314 | A1 | * | 10/2004 | Bhogal et al. ................ 345/780 |
| 2004/0243419 | A1 | * | 12/2004 | Wang ................ G10L 15/1822 704/277 |
| 2005/0010418 | A1 | | 1/2005 | McNair |
| 2005/0010892 | A1 | | 1/2005 | McNair |
| 2005/0108659 | A1 | * | 5/2005 | Philyaw ................ 715/862 |
| 2005/0154591 | A1 | * | 7/2005 | Lecoeuche ........ H04M 1/72561 704/270.1 |
| 2005/0172232 | A1 | * | 8/2005 | Wiseman ................ 715/718 |
| 2006/0087938 | A1 | * | 4/2006 | Lin ................ 369/47.1 |
| 2006/0259392 | A1 | * | 11/2006 | Rabenold ................ G06Q 10/10 705/37 |
| 2007/0179778 | A1 | * | 8/2007 | Gong et al. ................ 704/9 |
| 2007/0189597 | A1 | * | 8/2007 | Limer et al. ................ 382/153 |
| 2008/0040635 | A1 | * | 2/2008 | Larcheveque et al. ........ 714/49 |
| 2008/0163342 | A1 | * | 7/2008 | Christopherson ................ 726/4 |
| 2008/0184100 | A1 | * | 7/2008 | Selig ................ G06F 17/243 715/225 |
| 2008/0266255 | A1 | * | 10/2008 | Lawson et al. ................ 345/163 |
| 2009/0099892 | A1 | * | 4/2009 | Iijima ................ 705/7 |
| 2009/0150777 | A1 | * | 6/2009 | Feldman et al. ................ 715/702 |
| 2010/0115454 | A1 | * | 5/2010 | Tuli ................ 715/780 |

FOREIGN PATENT DOCUMENTS

| | | |
|---|---|---|
| WO | WO0150257 | 7/2001 |
| WO | WO0269320 | 9/2002 |
| WO | WO2005008465 | 1/2005 |
| WO | WO2005008476 | 1/2005 |

OTHER PUBLICATIONS

Eight pages—Georg Niklfield, Robert Finan, Michael Pucher, "Component-based multimodal dialog interfaces for mobile knowledge creation", Jul. 2001, Proceedings of the workshop on Human Language Technology and Knowledge Management—vol. 2001 Publisher: Association for Computational Linguistics.

Six pages—Wright Hastie; Johnston; Ehlen, P., "Context-sensitive help for multimodal dialogue", Multimodal Interfaces, 2002. Proceedings, Fourth IEEE International Conference on Oct. 14-16, 2002 pp. 93-98 Digital Object Identifier 10.1109/ICMI.2002. 1166975.

Fifteen pages—Takebayashi, Spontaneous Speech Dialogue System TOSBURG II—The User-Centered Multimodal Interface, Published Nov. 15, 1995.

Four pages—Wang. "SALT: A Spoken Language Interface for Web-based Multimodal Dialog Systems," In Proc. ICSLP, 2002, pp. 2241-2244.

Three pages—Bers, et al. "Designing Conversational Interfaces with Multimodal Interaction", DARPA Workshop on Broadcast News Understanding Systems, 1998, pp. 319-321.

Eight page International Search Report for counterpart PCT Application No. PCT/US2011/044823 mailed Dec. 2, 2011.

Exam Report in Related EP Application 11749967.3, Dated Apr. 24, 2015, 3 pages.

European Exam Report in related EP Application No. 11749967.3, Dated May 10, 2016, 3 Pages [No new refereneces].

Australian Patent Examination Report No. 1 in related AU Application No. 2011299507, Dated May 27, 2016, 4 pages.

* cited by examiner

Damaged Goods Report

Product ID: [barcode] [QR]—104
100 — xxx-xxx-xxxxxx
102

Purchase Order:
105 — xxx-xxx-xxxxxx

Quantity Damaged:
xx

Quantity Type:
1 - Pounds
2 - Each

Damage Type:
1 - Crushed Case
2 - Abandoned Pallet
3 - Water Damage
4 - Past Expiration Date
5 - Hole in Bag
6 - Other — 106

FIG. 4A

Damaged Goods Report

Product ID:
100 — 681-326-841232

Corned Beef, Hormel, 35lb
Stock Location 4539-2

Purchase Order:
105 — 51-65853-1

Damage Type: 108 110 112

Quantity Damaged:
xx

Quantity Type:
1 - Pounds
2 - Each

1 - Crushed Case
2 - Abandoned Pallet
3 - Water Damage
4 - Past Expiration Date
5 - Hole in Bag
6 - Other — 106

FIG. 4B

Damaged Goods Report

Product ID:
100 — 681-326-841232

Corned Beef, Hormel, 35lb
Stock Location 4539-2

Purchase Order:
105 — 51-65853-1

Damage Type:
3 - Water Damage — 106

Quantity Damaged:
2

Quantity Type:
2 - Each

Damaged Goods Report

Product ID: 681-326-841232

Corned Beef, Hormel, 35lb
Stock Location 4539-2

Purchase Order: 51-65853-1

Quantity Damaged: 2

Damage Type:
3 - Water Damage

Quantity Type:
2 - Each

Damaged Goods Report

Product ID: 681-326-841232

Corned Beef, Hormel, 35lb
Stock Location 4539-2

Purchase Order: 51-65853-1

Quantity Damaged: 2

Damage Type:
3 - Water Damage

Quantity Type:
2 - Each

---- VOICE
--·-- SCAN
—— KEY

FIG. 5D

Damaged Goods Report

Product ID: 681-326-841232

Corned Beef, Hormel, 35lb
Stock Location 4539-2

Purchase Order: 51-65853-1

Quantity Damaged: xx

Damage Type: (1)

1 - Crushed Case
2 - Abandoned Pallet
3 - Water Damage
4- Past Expiration Date
5 - Hole in Bag
6 - Other Quantity Type:
1 - Pounds
2 - Each

Damaged Goods Report

Product ID: 681-326-841232

Corned Beef, Hormel, 35lb
Stock Location 4539-2

Purchase Order: 51-65853-1

Quantity Damaged: 2

Damage Type:

3 - Water Damage

Quantity Type:

2 - Each

FIG. 6D

Damaged Goods Report

Product ID:
140 — xxx-xxx-xxxxx

Purchase Order:
142 — xxx-xxx-xxxxx

Damage Type:
144 —
1 - Crushed Case
2 - Abandoned Pallet
3 - Water Damage
4- Past Expiration Date
5 - Hole in Bag
6 - Other

FIG. 7A

Damaged Goods Report

Purchase Order:
142 — xx-xxxxx-x

Damage Type:
144 —
1 - Crushed Case
2 - Abandoned Pallet
3 - Water Damage
4- Past Expiration Date
5 - Hole in Bag
6 - Other Quantity Damaged:
146 — xx

**Corned Beef, Hormel, 35lb
Stock Location 4539-2**

Product ID:
681-326-841232 — 140

FIG. 7B

Damaged Goods Report

Damage Type:
- 1 - Crushed Case
- 2 - Abandoned Pallet
- 3 - Water Damage
- 4 - Past Expiration Date
- 5 - Hole in Bag
- 6 - Other Corned Beef, Hormel, 35lb
Stock Location 4539-2

Product ID: 681-326-841232

Purchase Order: 51-65853-1

Quantity Damaged: xx

Quantity Type:
- 1 - Pounds
- 2 - Each

FIG. 7C

Damaged Goods Report

Product ID: 681-326-841232

Purchase Order: 51-65853-1

Quantity Damaged: 2

Quantity Type: 2 - Each

Corned Beef, Hormel, 35lb
Stock Location 4539-2

Damage Type: 3 - Water Damage

FIG. 7D

MULTIMODAL USER NOTIFICATION SYSTEM TO ASSIST IN DATA CAPTURE

TECHNICAL FIELD

This invention relates to multimodal software applications and more particularly to coordinating multimodal data input with notification to a user of valid input mechanisms to assist in capturing information and data.

BACKGROUND

Speech recognition has simplified many tasks in the workplace by permitting hands-free communication with a computer as a convenient alternative to communication via conventional peripheral input/output devices. A worker may enter data by voice using a speech recognizer and commands or instructions may be communicated to the worker by a speech synthesizer having a text-to-speech (TTS) functionality. Speech recognition finds particular application in mobile computing devices or mobile computers in which interaction with the computer by conventional peripheral input/output devices is restricted or inconvenient.

One particular work area where mobile computing devices and voice-directed work using such mobile devices have become well-established is the field of inventory management. However, other areas of work have benefited from such technology as well, such as healthcare services. Voice-assisted/directed work systems rely on computerized management systems for performing various diverse tasks, such as product distribution, manufacturing, quality control, and patient care. An overall integrated system involves a combination of a central computer system for tracking and management, and the people or workers who use and interface with the central computer system in the form of order fillers, pickers, care providers, and other workers. The workers handle the manual aspects of the integrated system under the command and control of information transmitted from the central computer system to the mobile computer devices carried by the workers.

As the workers complete their assigned tasks, they are provided with instructions and information via speech prompts, and then answer the prompts or otherwise provide data using speech. The central computer system collects a variety of types of information based on the specific assigned task and data or input from the worker, such as through speech or some other data capture. For example, when a worker is filling orders by picking inventory from the storage racks, the central computer system will request information on product identification and quantity so that the central computer system can properly notify inventory managers when supplies are low on a given item of inventory. In another example, when a worker is investigating damaged inventory for quality control purposes, the central computer system will request information on product identification, purchase order identification, and damage descriptions for the items affected. The use of speech as a type of input mechanism finds advantageous application in these and other situations because workers may be more efficient if both hands are free for doing work.

While speech is useful as an input and output mechanism for assisting a user to complete their work tasks, other input/output modes might also be utilized in directing a worker to perform a particular task in capturing data associated with the performance of that task. Such multiple mode or multimodal applications have been developed to coordinate the various input components or devices and output components or devices associated with a multimodal system. These so-called multimodal systems coordinate a plurality of input and output components provided with the mobile computer device, including microphones, speakers, radio-frequency identification (RFID) readers or scanners, barcode scanners, display screens, touch screens, printers, and keypads, for example. One example of such a multimodal software application is described in U.S. Patent Publication No. 2005/0010892, co-owned by the assignee of the present application, the disclosure of which is hereby incorporated by reference in its entirety. These multimodal applications and systems enable the smooth entry of data in various different modes or forms, such as keyboard entry, barcode, or RFID scanning voice and others. The applications coordinate the inputs and outputs in the various modes of the multimodal system. However, as with any such system to assist a worker in the performance of their job, their ability to efficiently use such systems in paramount.

One particular advantage in a voice-directed/assisted system is the ability of a user to speak ahead or talk ahead of the speech prompts that they may receive from the system. For example, in the collection of data associated with a particular task, a speech-based system might provide spoken prompts to a user, such as to ask a question. The user, in reply, would then speak a particular utterance associated with that prompt, such an answer to the questions of the prompts or otherwise address the prompt. In that way, data is gathered. In some speech systems, such as the Vocollect Voice™ Product used with the Talkman available from Vocollect, Inc. of Pittsburgh, Pa., a user might be allowed to speak multiple utterances before or ahead of the voice prompts, without waiting for the audible prompting. This "speak-ahead" feature generally requires that the user have knowledge of the upcoming prompts in order to do so. When such a speak-ahead feature is utilized, the multiple utterances are captured as responses to specific upcoming prompts, and efficiency is enhanced because the prompts are answered in order and the system moves ahead without having provided those prompts.

Such a speak-ahead optimization is particularly useful in voice-directed work where the workflows are relatively consistent, and do not vary significantly, and a user can thus gain knowledge regarding the upcoming prompts. However, when voice is utilized more to assist the work of a user, rather than specifically direct that work, such a speak-ahead feature is less than advantageous. In such an area, the workflows would generally be less predictable and less repeated, and thus, it is more difficult for a worker to obtain the knowledge or memory of the upcoming prompts. Furthermore, in speech-assisted work environments, the workflows are generally part-time in nature. As such, they are generally done on a part-time basis by the workers in the system, and those workers are not able to memorize the prompt order as readily. Therefore, it is desirable to address such drawbacks in a speech-assisted system, and to allow the speak-ahead optimization or features thereof to be implemented in such a system to improve the efficiency of a worker. Furthermore, even in those systems where the workflow is more consistent and voice-directed, there could still be a problem with worker turnover. Such turnover leads to situations where certain worker are inexperienced with the system, and do not anticipate what data needs to be entered or what voice utterances need to be uttered to answer or address the prompts for any given task. Therefore, there is further need to improve the ability of inexperienced workers to implement a speak-ahead feature within a work system utilizing speech, such as a multimodal system wherein speech is one of the input and output modes.

While multimodal systems, such as multimodal systems utilizing speech, can provide great flexibility with respect to assisting or directing a user in their work tasks, such flexibility can also provide confusion and inefficiency in the work environment due to user inexperience in using the system. For example, when multiple input mechanisms in a multimodal system are available to a user for entering data or other information or answering prompts or filling in data fields, the user might choose a particular method of input based upon their preference, the availability of the input mode, or just the knowledge of what modes are available. However, with the multiple numbers of modes available in a multimodal system, inefficiencies can be created as a user tries unsuccessfully to produce a valid response. For example, a user might be trying to select a particular input from a list using voice, and may try to speak a particular response that makes sense to them, but which is not a valid selection. This can lead to a user miscategorizing the input, or simply not completing the necessary input or documentation to the system. Accordingly, it is further desirable to improve efficiencies within a multimodal system, such as a multimodal system using voice, so that a user can provide the necessary input data or otherwise address or answer a prompt.

The drawbacks in the prior art are addressed by the invention, and other advantages are provided by the invention, as set forth herein.

SUMMARY

A multimodal system for processing information includes a computer device, such as a mobile or portable computer device that interfaces with a plurality of input mode components/devices and a plurality of output mode components/devices. The input and output mode components are coupled with the computer device for providing input data to the computer device and handling output data from the computer device. A processing system of the computer device is configured to receive data from at least one of the plurality of input mode components and output data to one of the plurality of output mode components and is configured to execute a dialog that provides at least one prompt to a user through an output mode component. The dialog may involve several different modes including speech. To answer or otherwise address the prompt, the invention provides an indication associated with the dialog prompt through an output mode component for indicating to a user which input mode components are available to answer the prompt. The indication of the available input mode components for answering the prompt may be audibly or visually provided with a suitable output mode component such as a speaker or a display. An audible indication may include speech or an earcon. A visual indication may include at least one of an icon, text, and color.

In another embodiment, the invention executes a dialog that provides a sequence of prompts to a user through an output mode component. The invention then provides indications associated with the prompts that reflect an order of the sequence of prompts. The indications are provided through an output mode component for indicating to a user the current prompt and at least the next prompt in sequence so that a user may provide answers to the prompts in a sequential order. The indications might be provided as visual indications shown on a display. The visual indications could be icons positioned adjacent to the prompts on the display or the visual indications may be part of the prompts on the display. The visual indications might reflect an order of the sequence of the prompts using the size of the prompts, the position of the prompts, or blinking portions of the prompts. Icons might be differentiated using shape, color, and numbering to reflect the order of the sequence of prompts.

BRIEF DESCRIPTION OF THE DRAWINGS

The accompanying drawings, which are incorporated in and constitute a part of this specification, illustrate an embodiment of the invention and, together with a general description of the invention given below, serve to explain the principles of the invention.

FIGS. 4A-4C illustrate sequential schematic views of the display screen of the system of FIG. 1 during operation of an exemplary multimodal system of the invention.

FIGS. 5A-5D illustrate sequential schematic views of the display screen of the system of FIG. 1 during operation of an exemplary multimodal system of the invention.

FIGS. 6A-6D illustrate sequential schematic views of the display screen of the system of FIG. 1 during operation of an exemplary system of the invention.

FIGS. 7A-7D illustrate sequential schematic views of the display screen of the system of FIG. 1 during operation of an exemplary system of the invention.

DETAILED DESCRIPTION

Figure 1:
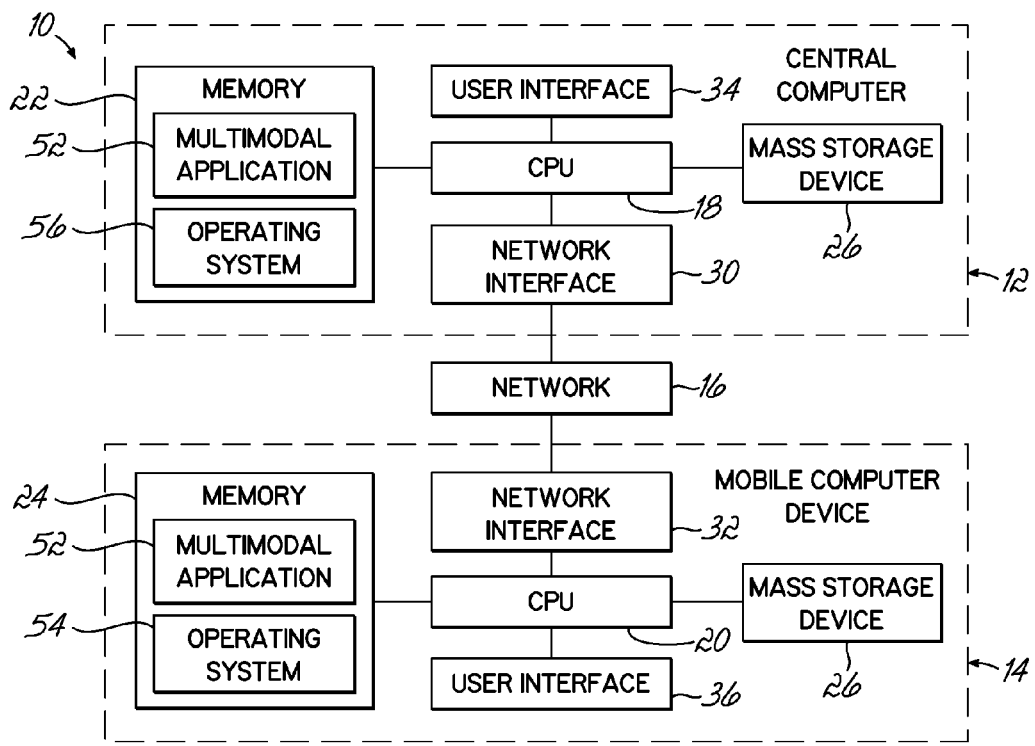
FIG. 1 is a schematic view of a multimodal system including a computer device configured to execute a multimodal application according to the invention.
Figure 3:
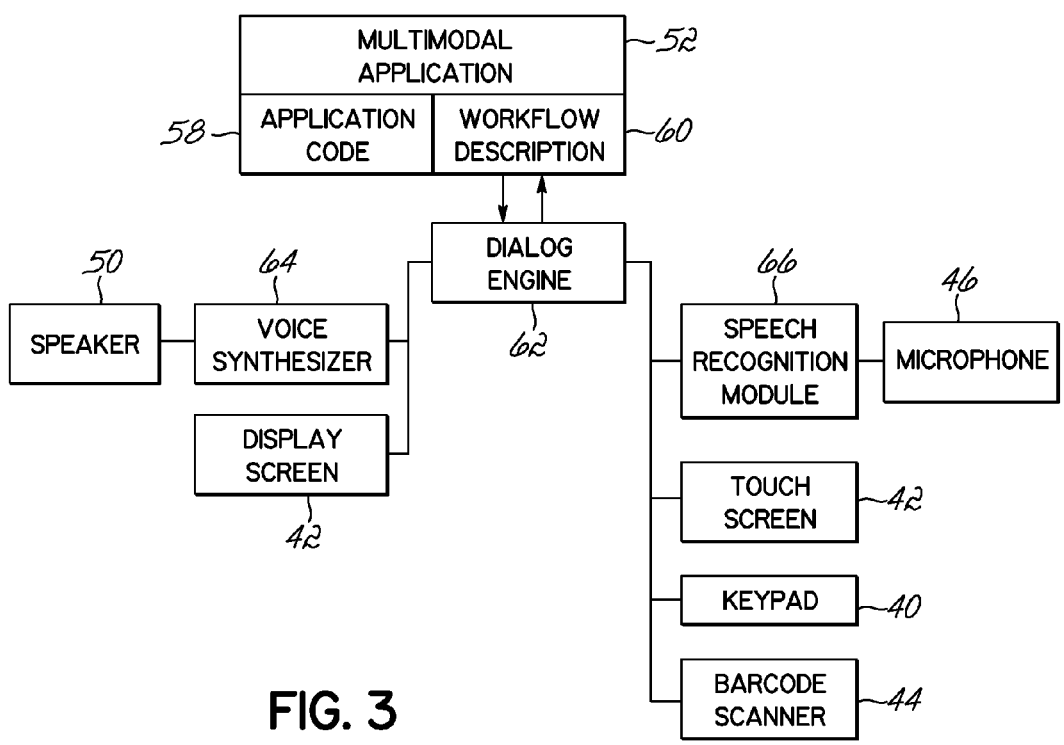
FIG. 3 is a schematic view of the functional or components of an exemplary multimodal application of FIG. 1.
Figure 2:
FIG. 2 is a perspective view of a worker using the system of FIG. 1.

FIGS. 1-3 illustrate exemplary hardware and software environments suitable for implementing and executing a multimodal system and application, consistent with the embodiments of the invention. Such an exemplary multimodal system, as discussed, is not meant to be limiting, and the invention might be implemented in various different multimodal systems. In particular, FIG. 1 illustrates a schematic representation of a multimodal system 10 according to one embodiment of the invention. The system 10 includes a central computer or system 12 interfaced with another computer, such as a mobile computer device 14 over a network 16, such as a suitable wireless network like a LAN. Multiple devices 14 might interface with central computer 12. The central computer 12 and the mobile computer device 14 each include a processor or central processing unit (CPU) 18, including one or more microprocessors coupled to memory 22, 24, which may represent the random access memory (RAM) devices comprising the primary storage, as well as any supplemental levels of memory. In addition, each memory 22, 24 may be considered to include memory storage physically located elsewhere in central computer 12 and mobile computer device 14, such as one or more non-volatile mass storage devices 26, 28. These non-volatile mass storage devices 26, 28 may include a flash USB drive, a removable disk drive, a hard disk drive, a direct access storage device, or an optical drive (e.g., a CD drive, a DVD drive, etc.). The central computer 12 and the mobile computer device 14 each include a network interface 30, 32 for connecting with the network 16 and exchanging information. It will be appreciated that central computer 12 and mobile computer device 14 include suitable analog or digital interfaces between the respective CPU's 18, 20 and the various components 22-32, as would be known in the art.

Furthermore, central computer 12 includes a user interface 34 incorporating a plurality of input interface components or input mode components and output interface components or output components that make up the multiple modes of the multimodal system for inputs and outputs to the system 10. Likewise, mobile computer device 14 also includes a user interface 36 incorporating a plurality of input interface/mode components and a plurality of output interface/mode components. FIG. 2 illustrates one exemplary work environment for implementing the invention. A worker 38 or other user carries a mobile computer device 14. The worker 38 interfaces with computer device 14 using multiple modes, such as speech input, through headset 48 or manual input through keypad 40 or touch screen 42, and output through the headset 48 and screen 42. One exemplary multimodal system for implementing the invention with a mobile device 14 is more clearly illustrated in FIG. 3. The plurality of input mode components may include a keypad or keyboard 40, a touch-control and display screen 42, a barcode and/or RFID scanner 44, and a microphone 46 on a headset 48 coupled with the mobile computer device 14. The plurality of output mode components may include the display screen 42 and a speaker 50 on the headset 48 or in the mobile computer device 14. One or more of the input mode components may be part of the computer device or may be a separate component. For example, the keypad 40 is part of device 14, while the headset 48 is separate. Similarly, the output components might be part of the device, such as the display or display screen 42, or separate like headset 45. To coordinate each of the various input mode components and the output mode components, the mobile computer device 14 executes a multimodal software application 52 configured to receive input data from one or more of the input components and deliver data to a user through one or more of the output components.

The multimodal software application 52 is stored in the memory 24 of the mobile computer device 14 and may be executed through the processing system of device 14 that may include processor 20 and an operating system 54 loaded into the memory 24. It will be appreciated that a similar multimodal software application 52 or portion thereof may be operated by an operating system 56 of the central computer 12 as well. The processing system for implementing the invention is not limited to the disclosed embodiments and the system and applicable software might vary in other embodiments. The multimodal software application 52 might include both application code 58 and a workflow description 60. The application code 58, for example, is programmed to retrieve and execute a specific workflow description 60 for a given task that the worker 38 is completing. Thus, there may be different workflow descriptions 60 for different tasks. The workflow description 60 chosen ensures that the appropriate work instructions/directions are provided to a user and the data is collected at the appropriate times from a worker using the mobile computer device 14 for updating the records of the central computer 12 and the system 10 during the completion of various work tasks.

With further reference to FIG. 3, the system 10 includes a dialog engine 62 in operative communication with or part of the multimodal software application 52. The dialog engine 62 may also be stored in the memory 24 of the mobile computer device 14. For a given task, the workflow description 60 will carry on a dialog with a worker, which may include a series of messages or instructions or questions to output to a worker 38. Such elements of the dialog are generally referred to as "prompts". The workflow description 60 will also include a series of instances or junctures where input is expected to be received in response to the prompts. That is, the prompts are answered or addressed by the user. In a multimodal system 10 having a plurality of input components and a plurality of output components, the workflow description 60 can instruct the dialog engine 62 to provide input and output in many different forms. The prompts used herein are not limited, and may be questions that are asked through speech or data fields that must be filled in by a user, for example. Therefore, the prompts may take various forms. Also, the prompts may be answered or addressed in various ways as well. To that end, some input and output interface components are appropriate for some prompts, and other input/output components may not be appropriate for certain prompts. Similarly, the components and modes for answering or addressing the prompts may vary. In these instances, each workflow object of the workflow description 60 may include a designation of which modes or components are to be used with respect to that workflow object. For example, a prompt asking for a quantity of goods may either designate that the text "What quantity?" be shown on the display screen 42 or designate that an audible prompt or question be provided by the speaker 50 to the user, in accordance with the invention. The prompt may also include information indicating which input modes or components are appropriate to capture or receive any incoming data for answering or addressing the prompt.

Consequently, the dialog engine 62 will be instructed by the workflow description 60 as to which modes or components to use for any given prompt. As shown in FIG. 3, the dialog engine 62 controls the execution of the workflow description 60 by managing the plurality of output components and the plurality of input components. For example, the dialog engine 62 may provide an output prompt by causing a voice synthesizer 64 with a text-to-speech (TTS) functionality to produce an appropriate voice prompt played by the speaker 50. Alternatively, the dialog engine 62 may provide an output prompt on the display screen 42. In a similar fashion, to address the prompt, the dialog engine 62 may receive speech information from a user via speech recognition module 66 that is operatively connected to the microphone 46, or via a touch-control screen 42, a scanner 44, or the keypad 40. It will be appreciated that appropriate software/hardware is known in the art are provided between the dialog engine 62 and the plurality of input and output components, and additional input/output modes and components may be added as required without departing from the scope of the invention.

In a multimodal system, as noted above, it is often difficult developing an efficiency using the system, due to the multiple possible modes. For example, a worker 38 may not be familiar with the workflow description 60 or dialog for a task he is performing due to lack of repetition of the task or simply inexperience. In these situations, it may be unclear what input mode components are appropriate for addressing a given prompt. In accordance with one aspect of the invention, the processing system and multimodal software application 52 of the invention provides a notification or indication with a particular prompt or input field of which input components or modes are valid to input data or to input a response for that prompt or field to address the prompt. The indication is provided through an appropriate output mode for indicating to a user which input modes/components are available to address the prompt. The invention utilizes an indication in one mode to inform a user that certain modes are enabled or suitable for a response to the prompt or for entry of data in a field associated with a prompt. For example, if the prompt from the workflow description 60 is to be audibly delivered with the speaker 50, such as in a speech directed/assisted work environment, the indication may follow the prompt by audibly listing the input components or modes that may be used to respond or otherwise address the voice prompt. Alternatively, if the prompt from the workflow description 60 is in the form that is visually delivered on the display screen 42, such as an open data field, the dialog engine 62 may then also provide a visual cue on the display screen 42 adjacent to the prompt or field to indicate the available input components or modes for response. The indication might be provided through a different mode as well. Therefore, the indication for indicating to a user which input mode components are available to address the prompt might be provided through the same output mode component or a different output mode component, as is used to provide the prompt to the user.

One example of an embodiment of the invention is illustrated in FIGS. 4A-4C. FIGS. 4A-4C include a series of screenshots of a display or display screen 42, which may be implemented in a mobile device 14, for example. The screen 42 illustrates a series of prompts in the form of data fields for providing a damaged goods report, such as in an inventory system. In this example, and other examples herein, data entry for a damaged goods report is managed by the multimodal software application 52. As can be seen in FIG. 4A, the first prompt/field 100 is highlighted by placing a bold highlighted box around the Product ID field. Accompanying the first prompt 100 are a pair of visual icons 102, 104 adjacent to the highlighted prompt 100. The visual icons 102, 104 correspond to modes for input or response to the prompt, such as bar code scanning 102 and voice entry 104, respectively. Thus, a worker 38 knows that the Product ID prompt/field 100 can be addressed or filled in by speaking the ID into the microphone 46 of a headset 48 or scanning the barcode with an appropriate scanner 44. The user does not have to memorize or know all the suitable input modes for addressing prompt 100. Rather, in the illustrated embodiment of FIGS. 4A-4C, the display 42 provides a visual icon indicating the suitable input modes for addressing that prompt/field. Once a response to the prompt is provided, such as by a spoken utterance or a scan, the field is visually filled with the input data or information. Alternatively, or in addition thereto, speech might be used to indicate that a "scan" or "voice" are suitable input modes, along with icons 102, 104.

Moving to FIG. 4B, the Product ID 100 and Purchase Order 105 prompts have been addressed, and the fields have been filled, and another prompt is indicated by another highlighted box around the Damage Type prompt or field 106. Again, the prompt field 106 is accompanied by a set of visual icons 108, 110, 112 in close proximity to the Damage Type prompt field 106. In this case, icon 108 indicates that barcode scanning is not an appropriate mode. Therefore, in accordance with one aspect of the invention, the icons can also provide a negative indication with respect to a certain mode to indicate that the mode is not available to the user for input of data. Of course, simply leaving the mode out of the list of provided icons might also serve to indicate an unavailable mode, as in FIG. 4A. Icon 110 indicates that the worker 38 may speak the data into the microphone 46 for a speech or voice mode, and icon 112 indicates that the worker 38 may enter the data with the keypad 40, as another available mode. This process of prompts and indications continues until all the prompts are addressed, and entry fields have been completed or the prompts are otherwise answered, as shown in the final state of FIG. 4C.

Another example of the notification provided with each prompt, in accordance with an embodiment of the invention, is illustrated in FIGS. 5A-5D. As in the previous operation, a first prompt 100 is provided in FIG. 5A by highlighting the prompt/field 100, such as the Product ID field. The notification of valid input modes or components is now provided by words or text 114, 116 displayed adjacent to the visual prompt and the icons 102, 104. The text 114 indicating that the scanner 44 may be used may accompany the visual scanner icon 102 as previously described. Likewise, the text 116 indicating that voice or speech may be used may accompany the voice visual icon 104 as previously described. Alternatively, just text 114, 116 might be used without icons 102, 104.

Figure 5A:
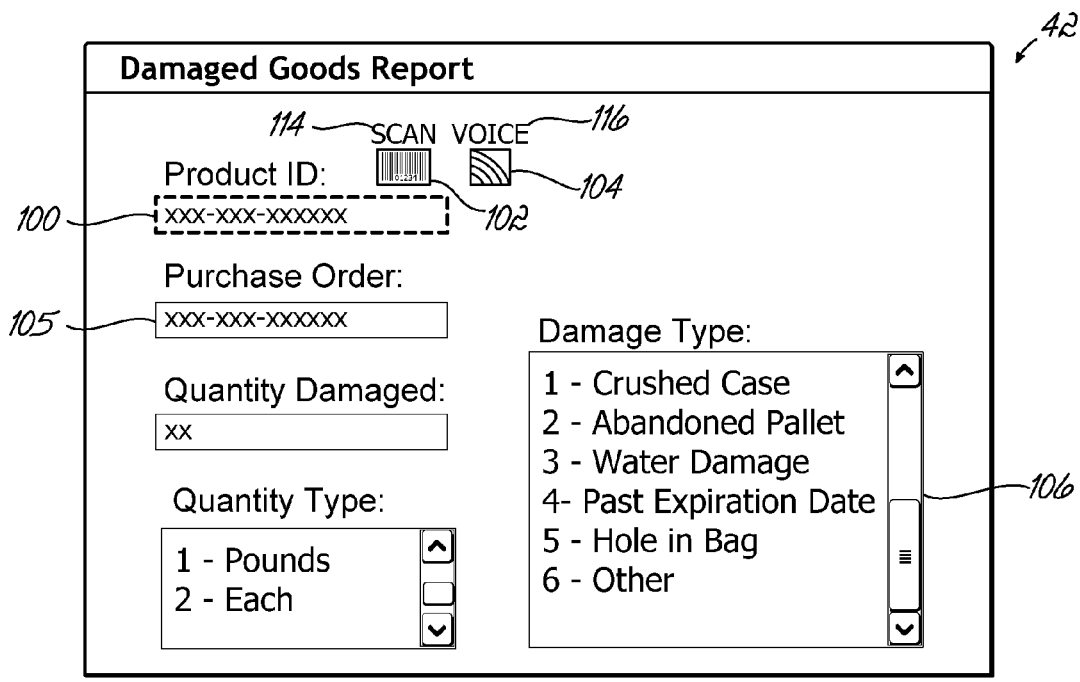
Figure 5B:
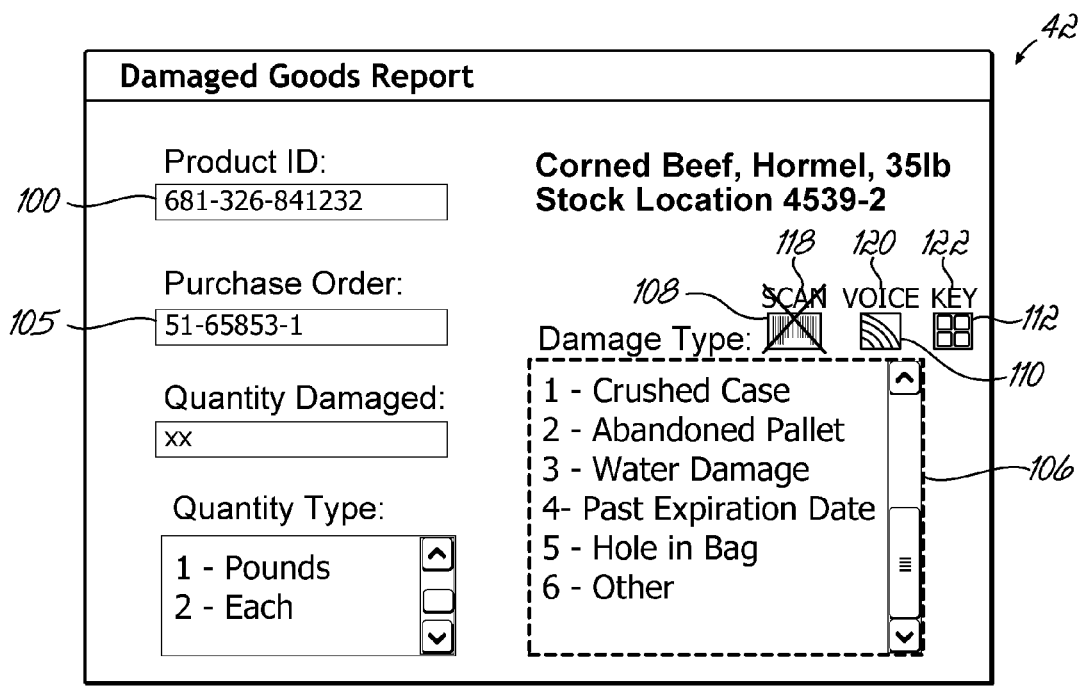

While the embodiments of the invention, as set forth in FIGS. 4A-4C and 5A-5D show a graphical indication of the suitable modes for data entry associated with the specific prompt or field, in another embodiment of the invention, those indications of suitable input modes might be provided by other output modes in the multimodal systems, rather than visually with display screen 42. For example, an audible indication might be provided to indicate suitable input modes. Referring to FIG. 5A as an example, the word "SCAN" 114 might be spoken to the user and played through speaker 50, rather than graphically illustrated, as noted above. Alternatively, the word might be spoken as well as being graphically illustrated so that a user might know a suitable input mode without actually viewing screen 42. Similarly, the "VOICE" 116 spoken indication might be provided audibly, such as through the speaker of headset 48. In addition to speech, audible tones might provide a non-speech audible indication of suitable input modes. For example, the input mode for speech might have one audible tone, whereas the input mode of a scanner or keyboard might have its own audible tone. As may be appreciated, audible tones may be used for each of the possible input modes. Such audible indications might be considered "earcons", rather than "icons". In any case, the audible prompting of the suitable input modes might be provided either through speech or voice using a text-to-speech (TTS) functionality or using such "earcons". Audible indications might be used alone without any visual indications.

In accordance with another aspect of the invention, multiple indications might be provided for each suitable input mode. For example, as illustrated in FIG. 5A, an icon 102 or 104 might be provided in addition to graphical text 114, 116, or audible indications. Alternatively, the icons 102, 104 might be used alone, as illustrated in FIG. 4A. Still further, the text 114, 116 might be displayed on screen 42 alone without any corresponding icons 102, 104. Alternatively, any other combinations of such graphical and text indications might be used with or without audible indications (speech or audible earcons). Therefore, the present invention is not limited to the specific types of indications or combination of indications given to advise a user as to suitable input modes for a particular prompt or data field.

Turning again to FIG. 5B, the prompt 106 is again illustrated with a bold or highlighted box, with the notification of the valid input mode or components displayed with text 118, 120, 122 corresponding to the previously-described icons 108, 110, 112 from FIG. 4B. Thus, a worker 38 immediately knows that the prompt 106 may be answered through speech and microphone 46 or the keypad or keyboard 40, but not by the scanner 44. Once all the prompts from the workflow description 60 have been answered or addressed the multimodal application 52, and workflow dialog would be complete, as shown in FIG. 5O.

In still another embodiment, the prompts may be color-coded with appropriate colors. For example, as illustrated in FIG. 5D, each of the prompts or fields might be encircled with a frame of a suitable color wherein the color would be indicative of selectable input modes for addressing that prompt or providing data input to the field. As illustrated in FIG. 5D, to indicate color, particular frame patterns are illustrated with their suitable input modes indicated. For example, prompt 100 might have colors 130 and 132 associate therewith wherein color 130 indicates that voice is a suitable input mode and color 132 indicates that a scan or input from a scanner is a suitable input mode. Alternatively, the prompt 106 might be appropriately color-coded with color 130 or color 134, which indicates that a keyboard or keypad input is a suitable mode as well as speech or voice. In that way, once a user is familiar with particular colors, they can readily do a prompt and know the suitable input modes.

In still another alternative embodiment of the invention, the various visual icons and text, such as icons 102, 104, or text 114, 116, might also be color coded appropriately for further visual indication of a suitable input mode for that particular prompt or field.

Color might also be used in the actual prompt window, rather than around the window. Therefore, the present invention is not limited to just the particular association of color near the prompt to indicate a suitable input mode, and will cover situations where the color is actually part of the prompt window as well as proximate to the prompt window.

Regardless of the visual indication cue or audible indication provided, the worker 38 may more efficiently work through the prompts of the workflow description 60 by knowing at a glance how to respond to the sequence of prompts. Even an experienced worker may benefit from the system 10 by learning new ways that prompts may be addressed or answered as the multimodal software application 52 changes to include more input modes and components and more output modes and components. The invention therefore, alleviates complications and cuts down training time in a multimodal system to thus increase work or efficiency and potentially decreasing the technical support load. Users are notified, on a particular input prompt or field, of what the valid or suitable input modes or mechanisms are for addressing that prompt/field. The users can then select the most efficient mode or method that they find for their daily task. In that way, a user would not have to be as vigorously trained regarding what valid input modes or mechanisms are available for each prompt, and would not have to remember what modes or mechanisms are valid for each prompt. This can be a particular advantage for tasks that are not implemented into a workflow on a high-repetitive basis, and will allow a user to rapidly navigate through a variety of tasks that they may encounter only infrequently.

In accordance with another embodiment of the present invention, a speak-ahead feature for a voice system is enhanced in a multimodal system by providing a visual indication to a user of a prompt order or future prompts in order to take advantage of a speak-ahead function. In one embodiment, the invention provides a notification to a user or worker indicating the current prompt to be addressed and the next subsequent prompts in the sequence of the workflow. This enables a worker 38 to use a speak-ahead voice feature for those suitable voice prompts. The speak-ahead functionality allows a worker 38 to provide input before a prompt is even presented for response, by providing multiple utterances, for multiple prompts in the sequence. For example, instead of requiring two different prompts such as "Gender?" and then "Hair Color?", a user may upon hearing the first prompt simply answer "Male—Brown". Thus, the second prompt has been addressed and becomes unnecessary and is skipped by the dialog engine 62. The dialog engine 62 also splits the entered input data into the appropriate responses or fields for the sequence of prompts. However, such a speak-ahead functionality requires that the worker 38 must know the sequence of prompts in order to use speak-ahead and become more efficient. This will not always be possible, such as for those work tasks that are infrequently encountered. A user never performs the task with sufficient repetition to be efficient.

The multimodal system of the present invention, however, allows a worker 38 who may be inexperienced with the workflow description 60 and prompts for a task to know the upcoming sequence of prompts and therefore incorporate speak-ahead to become more efficient, even for infrequent tasks. The invention enables this by providing visual notification with each prompt to indicate the current prompt and at least the next prompt in the sequence. The notification may be provided on the display screen 42 of the mobile computer device 14, as will be explained in the following two examples.

Figure 6A:
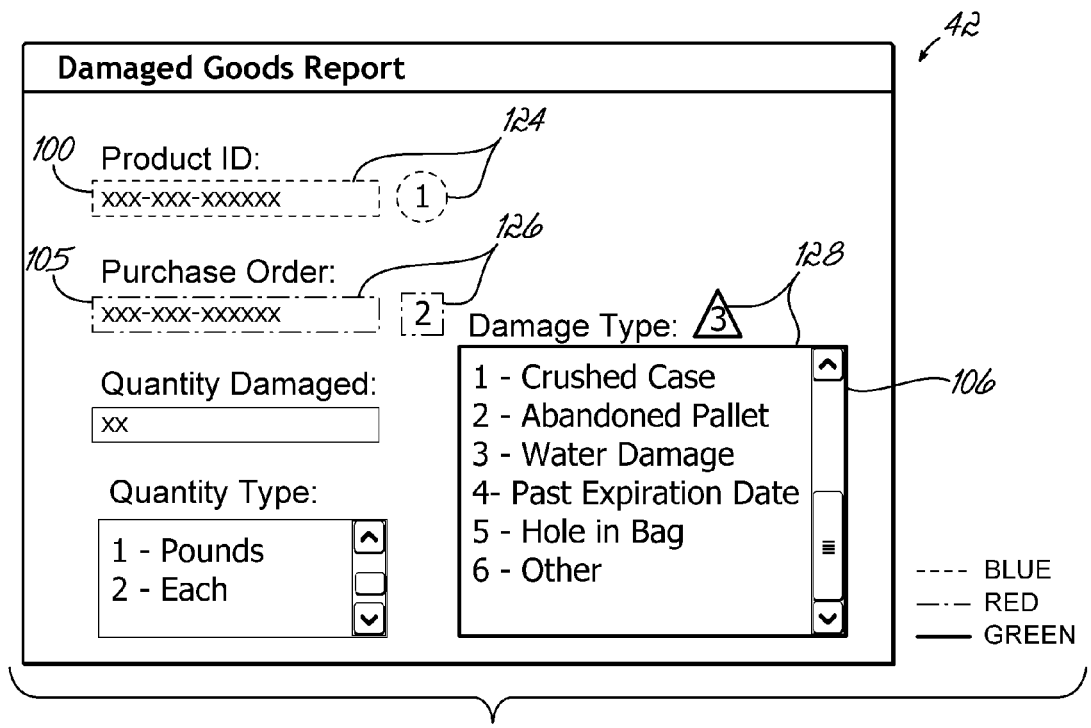

FIGS. 6A-6D illustrate a series of screenshots of the display screen 42 for another embodiment of the invention. As shown in FIG. 6A, the same series of prompts and fields is displayed for a damaged goods report as previously discussed in the other examples herein. The invention through multimodal software application 52 provides visual cues 124, 126, 128 on the display screen 42 adjacent to each of the next three prompts in the workflow dialog to illustrate a prompt sequence for any inputs provided, such as voice utterances from the user. The visual indication 124 for the first or current prompt may include an icon with the number 1, a certain shape such as a circle, or a certain color (indicated by the line type in FIG. 6A). The visual cue 124 may also include a color-coded highlight of the prompt/data field or its border for that prompt if color is used as an indication of sequential prompt order. In a similar fashion, the visual cue 126 for the second or next prompt may include an icon with the number 2, a certain shape such as a square, or a certain color applied to the icon or the data field or border. The visual cue 128 for the next or third prompt differentiates itself from the previous visual cues 124, 126 by using a different number, shape, icon, or color. Thus, a worker 38 would know from the display screen 42 in FIG. 6A that the next three prompts will be for a Product ID, a Purchase Order, and Damage Type, in that order.

Figure 6B:
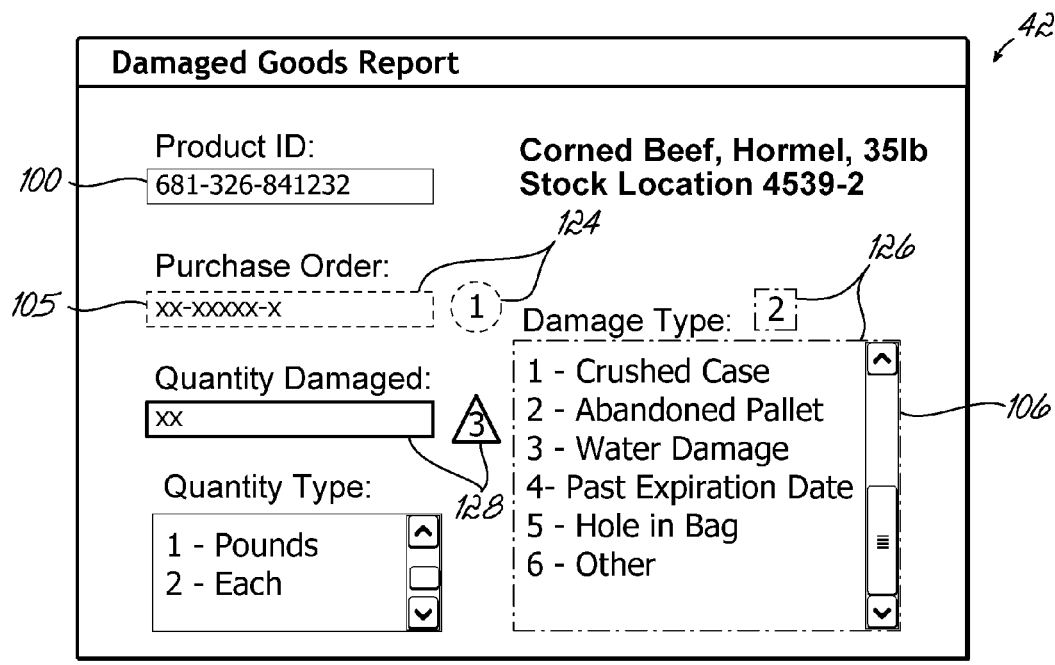

If the worker 38 enters the Product ID separately, the multimodal application 52 reorders the prompts and directs the prompts and notifications on the display screen 42 to shift or change as shown in FIG. 6B. Now the Purchase Order is indicated to be the first prompt, while the Damage Type and Quantity Damaged are indicated to be the second and third upcoming prompts. If the worker 38 again addresses prompt 105 and provides a Purchase Order entry or data by itself, the multimodal application shifts the prompts and prompt order on the display screen shown in FIG. 6C. In this state, the display screen 42 clearly indicates that the next sequential prompts will be Damage Type, Quantity Damaged, and Quantity Type. At any time in the prompt order, a speak-ahead functionality is provided. The visual indications or notifications guide the user to the proper speak-ahead order so that data may be entered by voice in the proper fashion. At the point in the prompt process, as shown in FIG. 6C, the worker 38 may choose to enter multiple responses and data for addressing the upcoming prompts by uttering or speaking "3 2 2" in that sequence. The dialog engine 62 then applies the three separate pieces of input data from the utterances as replies to the next three sequential prompts, finishing the query as shown in FIG. 6D.

Although the indications 124, 126, 128 illustrated show positioning, numbering, coloring, and shape as possible indications for prompt order, such visual indications are not limiting. For example, the size of the visual indications might be used such that the visual indications get larger in size or smaller in size in sequential order. Furthermore, the indications might blink on screen 42 in a pattern that provides information to the user about the sequential order of the prompts.

Although FIGS. 6A-6D illustrate visual indications are adjacent to prompts (e.g., 100, 105, 106), the visual indications of the invention might also be part of the prompts. That is, color differences between the actual prompts and data fields 100, 105, 106 might indicate the prompt sequence. Portions of the prompts might also blink differently to show prompt order.

The various different visual icons 124, 126, 128 may be provided with any combination of the suitable numbers, colors, shapes, and other indications, as noted above, in order to properly inform the user of the sequence of the prompts so that the speak-ahead feature in the voice mode of a multimodal system may be implemented properly and accurately for the dialog. This allows the speak-ahead feature to be utilized even when the workflow is less predictable or part-time in nature, such that the user may have difficulty in memorizing the prompt order. With the present invention, the speak-ahead or speak-over advantages of a voice mode are provided without requiring a user to memorize the prompt order. Using the screen-based clues, icons, or other visual indications about future prompts and the necessary prompt sequence, users are able to speak ahead in the work task and dialog.

FIGS. 7A-7D illustrate a series of screenshots of the display screen 42 for another embodiment of the invention. Like the previous operation, the processing system and particularly the multimodal software application 52, provides an indication of the current prompt and upcoming prompts in sequence by delivering visual indications on the display screen 42. Instead of using icons, the multimodal application 52 in an alternative embodiment positions the prompts on the display screen 42 in the order they will be presented for being addressed. Starting in FIG. 7A, a worker 38 will know that the upcoming prompts are Product ID followed by Purchase Order and Damage Type in the sequential order because that's how the prompts are positioned on the left half of the display screen 42 from top to bottom. The current prompt may also be indicated with a bold highlighted box which may include color as previously described.

As a worker 38 enters the Product ID, or otherwise addresses or responds to prompt 140, the entry is displayed and the prompt is moved to the right hand side of the display screen 42 as shown in FIG. 7B. The Purchase Order prompt 142 has now moved to the top of the left hand side to indicate it as the current prompt, followed by Damage Type 144 and Quantity Damaged 146. If the Purchase Order prompt 142 is addressed with a response, the multimodal application 52 progresses to the state shown in FIG. 7C, where the Purchase Order or field prompt 142 is filled in on the right hand side of the display screen 42. If a worker 38 then decides to enter "3 2 2" to answer the next three prompts on the left hand side of the display screen 42, the dialog engine 62 will recognize the multiple entries and associate them with the respective sequential prompts 144, 146, 148, as shown in the final state of FIG. 7D. The screen and prompts might then be rearranged in the final screen, as shown in FIG. 7D, when all of the prompts are answered.

While the present invention has been illustrated by the description of the embodiment thereof, and while the embodiment has been described in considerable detail, it is not the intention of the applicant to restrict or in any way limit the scope of the appended claims to such detail. Additional advantages and modifications will readily appear to those skilled in the art. For example, the multimodal software application 52 may provide with each prompt a notification of the upcoming prompts as well as a notification of which components in the plurality of input interface components are valid receivers for the respective prompt. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A multimodal system for processing information, the system comprising:

a computer device having a processing system with at least one processor;

a plurality of input mode components coupled with the computer device for providing input data to the computer device, the plurality of input mode components including at least one microphone coupled with a speech recognition element for processing user speech; and a plurality of output mode components coupled with the computer device for handling output data from the computer device, the plurality of output mode components comprising a display, and a speaker coupled with a voice synthesizer;

the processing system of the computer device being configured to:

receive input data from the speech recognition element;

provide output data to cause the display to provide visual indications;

provide output data by way of the voice synthesizer to cause the speaker to provide voice indications;

execute a workflow description for at least one task of a user, the workflow description including a dialog with the user for performance of the at least one task, wherein the dialog presents a sequence of prompts to a user through one or more of the plurality of output mode components;

provide, by way of the display, visual indications that are respectively associated with the sequence of prompts, wherein the visual indications indicate a speak-ahead order of the sequence of prompts of the dialog, comprising the indications providing to a user a notification of the current prompt and at least the next prompt in the order of the sequence so that the user may know the defined order and provide sequential speech input data in the same order for addressing the current prompt and at least the next prompt; and process sequential speech input data that is received from the user and to apply, in the same order as uttered, the sequential speech input data to the prompts in a defined order of the sequence of prompts of the dialog;

wherein the processing system is configured so that, in response to speech input data not being timely received from the user for a current prompt, the processing system provides, by way of the speaker, a voice indication that is associated with the current prompt so that the user may provide speech input data for addressing the current prompt;

wherein the processing system is configured so that, in response to speech input data being timely received from the user for a current prompt, the processing system does not provide by way of the speaker the voice indication that is associated with the current prompt; and wherein the processing system reorders said visual indications as the prompts are addressed to continue guiding the user to a proper speak-ahead order that associates all of said speech input data respectively with the prompts sequentially as said speech input data is received from the user by way of the at least one microphone.

2. The system of claim 1, wherein the visual indications are icons positioned adjacent to the prompts on the display.

3. The system of claim 2, wherein the icons are differentiated to reflect the order of the sequence of prompts, the icons being differentiated by at least one of the following: shape, color, and numbering.

4. The system of claim 1, wherein the visual indications are part of the prompts on the display.

5. The system of claim 4, wherein the visual indications reflect an order of the sequence of the prompts using at least one of the following: size of the prompts, position of the prompts, and blinking portions of the prompts.

6. A method for executing a multimodal application with a computer device including a plurality of input mode components and a plurality of output mode components coupled with the computer device, the computer device having a processing system with at least one processor, the method comprising the processing system:

executing a workflow description for at least one task of a user, wherein
the executing of the workflow description is comprised of providing a dialog with the user for performance of the at least one task,
the providing of the dialog is comprised of prompting a user to provide sequential speech input data to address a sequence of prompts in accordance with the dialog, and
the prompting is comprised of presenting the sequence of prompts to the user using one or more of the plurality of output mode components; and applying sequential speech input data received from the user to the prompts in a speak-ahead order uttered by the user;

wherein the prompting is further comprised of
providing, by way of a display of the plurality of output mode components, visual indications that are respectively associated with the sequence of prompts, wherein the visual indications indicate the order of the sequence of prompts of the dialog for notifying the user of the current prompt and at least the next prompt in the order of the sequence so that the user may know the defined order and provide sequential speech input data in the same order for addressing the current prompt and at least the next prompt,
in response to speech input data not being timely received from the user for a current prompt, providing, by way of a speaker of the plurality of output mode components, a voice indication that is associated with the current prompt so that the user may provide speech input data for addressing the current prompt,
in response to speech input data being timely received from the user for a current prompt, not providing by way of the speaker the voice indication that is associated with the current prompt, and
reordering said visual indications as the prompts are addressed to continue guiding the user to a proper speak-ahead order that associates said speech input data respectively with reordered prompts sequentially as said speech input data is received from the user.

7. The method of claim 6 further comprising determining for the speech input data received, whether the input data should be associated with a single prompt or multiple prompts in the sequence of prompts.

8. The method of claim 6, wherein the visual indications are icons positioned adjacent to the prompts on the display.

9. The method of claim 8, wherein the icons are differentiated to reflect the order of the sequence of prompts, the icons being differentiated by at least one of the following: shape, color, and numbering.

10. The method of claim 6, wherein the visual indications are part of the prompts on the display.

11. The method of claim 10, wherein the visual indications reflect an order of the sequence of the prompts using at least one of the following: size of the prompts, position of the prompts, and blinking portions of the prompts.

12. The method of claim 6, further comprising:
providing, through an output mode component, an indication associated with the prompts for indicating to a user which input mode components are valid to receive input data to address a prompt.

* * * * *